US009705963B2

(12) United States Patent
Schornack et al.

(10) Patent No.: US 9,705,963 B2
(45) Date of Patent: Jul. 11, 2017

(54) SYSTEMS, METHODS AND INTERFACES FOR EVALUATING AN ONLINE ENTITY PRESENCE

(71) Applicants: Jill Schornack, Rosemount, MN (US); Eric Iverson, Eagan, MN (US); Brian Doyle, Saint Paul, MN (US); Aaron Hareid, Apple Valley, MN (US)

(72) Inventors: Jill Schornack, Rosemount, MN (US); Eric Iverson, Eagan, MN (US); Brian Doyle, Saint Paul, MN (US); Aaron Hareid, Apple Valley, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 268 days.

(21) Appl. No.: 13/630,035

(22) Filed: Sep. 28, 2012

(65) Prior Publication Data

US 2014/0095598 A1    Apr. 3, 2014

(51) Int. Cl.
*H04L 29/08*    (2006.01)
*G06Q 10/06*    (2012.01)
(Continued)

(52) U.S. Cl.
CPC ............. *H04L 67/10* (2013.01); *G06Q 10/06* (2013.01); *G06Q 10/101* (2013.01); *G06Q 50/01* (2013.01)

(58) Field of Classification Search
CPC ........ G06Q 10/06; G06Q 10/10; G06Q 50/01; H04L 67/10
(Continued)

(56) References Cited

U.S. PATENT DOCUMENTS 8,122,091 B2 *   2/2012   O'Sullivan et al. .......... 709/206
8,250,157 B2 *   8/2012   Millmore et al. ............ 709/206
(Continued)

FOREIGN PATENT DOCUMENTS

AU    2016269536 A1    1/2017
CA    2 886 099 A1     4/2014
(Continued)

OTHER PUBLICATIONS

Ryan Wishart, Privacy Butler: A Personal Privacy Rights Manager for Online Presence, Mar. 29, 2010, IEEE, 672-677.*
(Continued)

*Primary Examiner* — Patrice Winder
*Assistant Examiner* — Angela Widhalm De Rodri

(57) ABSTRACT

A method for evaluating an online entity presence includes receiving a set of social media information for at least one entity and calculating a social media measurement where the social media measurement is associated with the set of social media information. The method further includes receiving a set of online profile information for the at least one entity, the set of online profile information being associated with one or more non-social media online profiles, and calculating an online profile measurement wherein the online profile measurement is associated with the set of online profile information. The method further includes calculating a reach value, the reach value being associated with the social media measurement and the online profile measurement and providing a reach score to a user where the reach score associated with the reach value.

14 Claims, 10 Drawing Sheets

(51) Int. Cl.
*G06Q 10/10* (2012.01)
*G06Q 50/00* (2012.01)

(58) Field of Classification Search
USPC .................... 705/7.39; 707/803; 709/204
See application file for complete search history.

(56) References Cited

U.S. PATENT DOCUMENTS

| | | | | |
|---|---|---|---|---|
| 8,607,295 | B2* | 12/2013 | Bhatia .................. | H04N 21/252 |
| | | | | 725/133 |
| 8,812,958 | B2* | 8/2014 | Willis et al. .................. | 715/736 |
| 2007/0011039 | A1 | 1/2007 | Oddo | |
| 2009/0063284 | A1* | 3/2009 | Turpin .................. | G06Q 30/02 |
| | | | | 705/14.61 |
| 2009/0328209 | A1* | 12/2009 | Nachenberg .................... | 726/22 |
| 2010/0042680 | A1* | 2/2010 | Czyzewicz et al. .......... | 709/203 |
| 2010/0205057 | A1* | 8/2010 | Hook et al. ................. | 705/14.52 |
| 2010/0325107 | A1* | 12/2010 | Kenton et al. ................ | 707/723 |
| 2011/0131095 | A1* | 6/2011 | Soza et al. ................. | 705/14.66 |
| 2011/0161331 | A1 | 6/2011 | Chung et al. | |
| 2012/0036127 | A1* | 2/2012 | Work et al. .................... | 707/732 |
| 2012/0046992 | A1* | 2/2012 | Hu ......................... | G06Q 30/02 |
| | | | | 705/7.29 |
| 2012/0226701 | A1* | 9/2012 | Singh ........................... | 707/748 |
| 2013/0080212 | A1* | 3/2013 | Li ......................... | G06Q 50/01 |
| | | | | 705/7.38 |
| 2013/0124257 | A1* | 5/2013 | Schubert ................ | G06Q 30/02 |
| | | | | 705/7.29 |
| 2013/0218640 | A1* | 8/2013 | Kidder ............... | G06Q 30/0204 |
| | | | | 705/7.33 |
| 2013/0218991 | A1* | 8/2013 | McConnell ....... | G06F 17/30702 |
| | | | | 709/206 |
| 2013/0339186 | A1* | 12/2013 | French et al. ............. | 705/26.35 |
| 2014/0089059 | A9* | 3/2014 | Vesely et al. ................ | 705/7.39 |
| 2015/0032504 | A1* | 1/2015 | Elango et al. ............... | 705/7.29 |
| 2015/0081740 | A1* | 3/2015 | Morrison et al. ............ | 707/792 |

FOREIGN PATENT DOCUMENTS

| | | |
|---|---|---|
| WO | 2014/052260 A2 | 4/2014 |
| WO | 2014/052260 A3 | 5/2014 |

OTHER PUBLICATIONS

Patent Examination Report dated Dec. 9, 2015, issued in corresponding Australian Patent Application No. 2013323804.
Response to Patent Examination Report filed Nov. 24, 2016 in corresponding Australian Patent App. No. 2013323804.
Response to Patent Examination Report filed Nov. 24, 2016, in corresponding Australian Patent Application No. 2013323804.
International search report and written opinion issued in corresponding PCT Application No. PCT/US2013/061291, dated Apr. 3, 2014, 6 pages.
International Preliminary Report on Patentability and written opinion issued in corresponding PCT Application No. PCT/US2013/061291, dated Apr. 9, 2015, 6 pages.

* cited by examiner

SYSTEMS, METHODS AND INTERFACES FOR EVALUATING AN ONLINE ENTITY PRESENCE

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2012 Thomson Reuters.

TECHNICAL FIELD

Various embodiments of the present invention concern systems, methods and interfaces for evaluating an online entity presence.

BACKGROUND

In the past, law firms would use the method of word of mouth advertising to engage new clients. Word of mouth advertising is an unpaid form of promotion, oral or written, in which satisfied customers tell other people how much they like a business, product, service, or event. Word of mouth is one of the most credible forms of advertising because people who do not stand to gain personally by promoting something put their reputations on the line every time they make a recommendation. With the creation of the internet, more firms are starting to place their firm's information onto a website, for example, to reach broader audiences than word of mouth. The firm's website information may be an example of an online presence. Then, with the evolution of the internet came social media networks. These social media networks may include Facebook®, Twitter®, LinkedIn® and the like. In the beginning these social media networks were focused on an individual's social media network. However, more recently, social media networks have provided firms a new way to provide word of mouth advertising. For example, if a firm creates a firm Facebook® account, a client may "like" the firm's Facebook® page. This "like" activity is an endorsement of the services the client received. Another activity may also be a posting on Twitter®, such as a tweet. These activities are examples of a new word of mouth. However, with this new word of mouth comes a greater responsibility to be involved in reaching new clients and engaging those new clients via the various different social media networks.

Known approaches to social media management include aggregating a firm's social media networks to a single screen where a user representing the firm (herein after "a user") may manage the postings, repostings, and connections surrounding the firm. For example, a social media management tool may allow the user to write a post that can get populated to all the social media networks without logging into each network individually. Also, within a social media management tool, the user may schedule a tweet and/or send automatic messages to those who follow a given firm. Known social media management tools are very helpful in gathering all the information displayable on one screen for a user to effectively manage. However, known social media management tools fail to provide a firm with any metrics around reaching out to new clients. For example, if the firm has seventeen (17) online profiles via seventeen (17) different websites and 100 Twitter® followers, do those items have enough reach to be effective? In addition, known social media management tools also fail to provide the firm with any metrics around engaging the followers that the firm has in social media networks. For example, if the user sends fifty (50) tweets a day to all 0.100 Twitter® followers, is the user positively engaging or overwhelming the followers?

Accordingly, the present inventors identified a need for improving the evaluation of an online entity presence including social media networks.

SUMMARY

The inventors propose an automated technique to evaluate an online entity presence including social media networks by calculating a reach value associated with a social media metric and an online profile metric. The social media metric is a measurement associated with a set of social media information. Social media information may include but is not limited to information associated with or related to one or more social media networks such as Facebook®, Twitter®, Google+®, LinkedIn® and the like. The online profile metric is a measurement associated with a set of online profile information. Online profile information may include but is not limited to information regarding the address of the entity, the phone number of the entity, links to reviews of the entity, physical location of the entity (if a firm, for example), practice area(s) and the like. In addition, evaluating an online entity presence may further include calculating an engagement value associated with a set of social media activities. Social media activities may include but are not limited to postings, repostings and/or comments on content.

One advantage of the improvement is to expand a firm's online footprint. In other words, how far is the firm reaching its potential clients? By using a reach score associated with a reach value, a user representing a firm can effectively manage the firm's online profiles and build a social media network that optimizes the reach to a potential client base.

Another advantage includes positively influencing social media networks conversations. In other words, how well is the firm engaging their social media client base? By using an engagement score associated with the engagement value, a user representing the firm strikes a balance between postings, repostings, comments and connections. In addition, the improvement allows the user to engage these social media networks often to raise the engagement score which provides an effective metric for the firm to monitor.

With these advantages, the firm may effectively monitor its online presence and social media network via the reach and engagement scores. Consequently, a user may choose to contextualize the activity by viewing different reach and engagement sections against relevant benchmarks, providing deeper insight into the reach and engagement scores. This targeted monitoring leads to increased awareness and visibility for the firm which allows the firm to focus on representing clients not tweeting.

Additional advantages and/or features of the present invention will be set forth in part in the description. It is to be understood that both the foregoing general description and the following detailed description of the present invention are exemplary and explanatory and are intended to provide further explanation of the present invention as claimed.

DETAILED DESCRIPTION OF THE EXEMPLARY EMBODIMENT(S)

Figure 1:
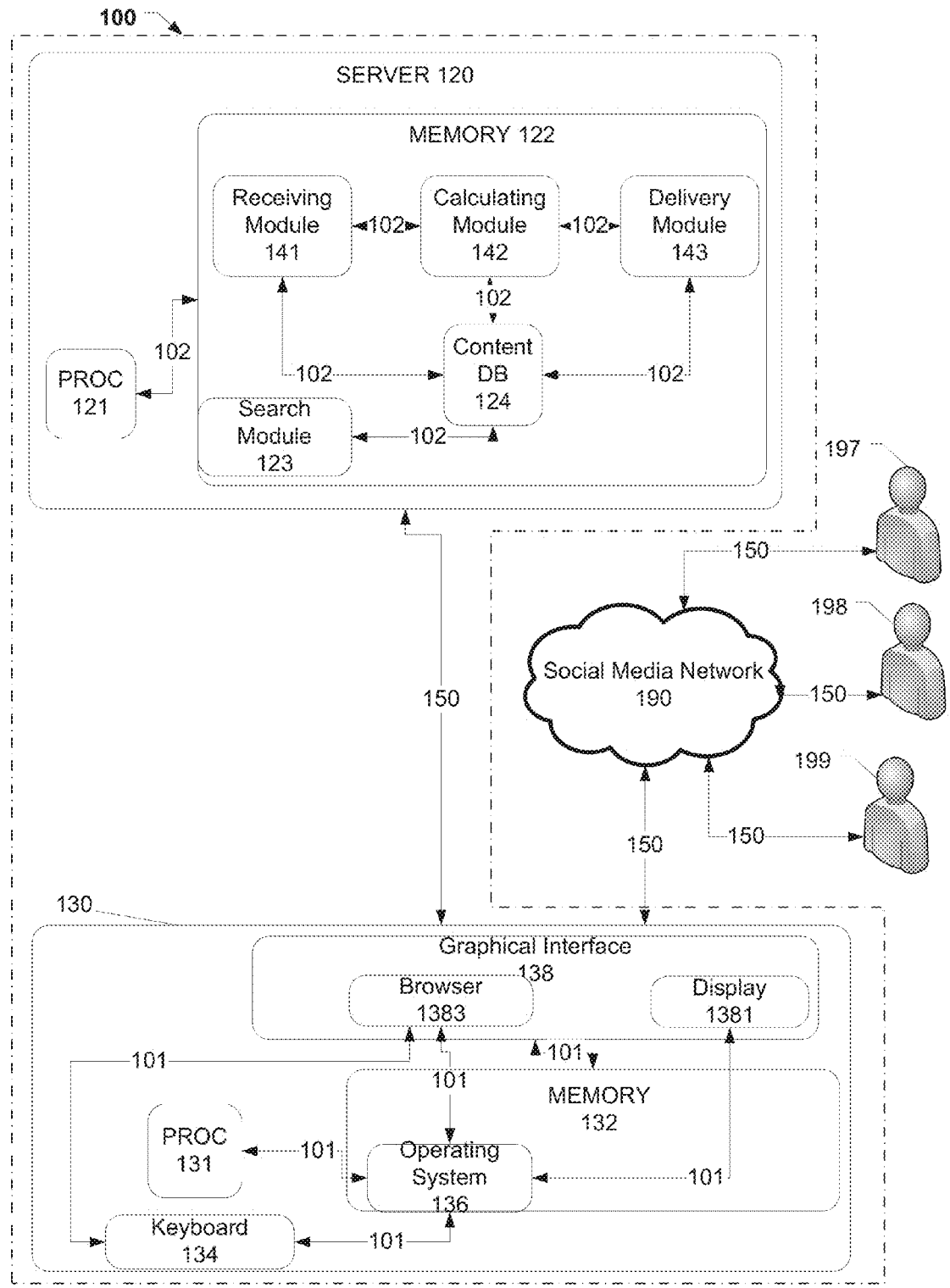
FIG. 1 is an exemplary system 100 which corresponds to one or more embodiments of the invention.

The description includes many terms with meanings derived from their usage in the art or from their use within the context of the description. However, as a further aid, the following examples are presented. An entity is a person, department, firm, team, corporation, cooperative, partnership, group and the like. For example, a law firm is an entity. A user represents an individual or a set of individuals that have access to systems, methods and interfaces described herein. For example, a firm in the abstract cannot login into a system. Instead, the firm selects an individual (i.e., a user) to access the system.

Social media networks allow the creation and exchange of user-generated content via one or more social media network interfaces. Exemplary social media networks include but are not limited to Facebook®, Twitter®, Google+®, LinkedIn®, MySpace® and the like. Social media networks allow accounts for individuals, groups, organizations, firms and the like. A social media contributor is an entity that uses one or more social media network interfaces, not the systems, methods and interfaces described herein, to ultimately execute social media activities such as posting, reposting and commenting (described later herein). For example, a person that uses a Facebook® network interface to post a message is a Facebook® social media contributor. By contrast, a user of the systems, methods and interfaces described herein does not use the social media network interfaces to invoke social media activities. However, in some embodiments, an individual in one capacity may be the user representing the firm while in another capacity being the social media contributor. For instance, the individual may send tweets via Twitter® which would make that individual a social media contributor. In another instance, the same individual may use the systems, methods and interfaces described herein to send another tweet which would make that individual also a user.

Social media information is information associated with or related to one or more social media networks. Exemplary social media information may include but is not limited to user-generated content, social media activities, number of followers, number of "likes" in Facebook®, number of connections, number of groups or circles, and metadata about the previously mentioned social media information. Exemplary social media metadata may include date, time, topic, sender, recipient, account information and the like.

Exemplary user-generated content may be related to social media activities such as posting, reposting and commenting. Posting is a social media activity where user-generated content is created and ultimately displayed on a social media network via an entity account. For example, creating and displaying a tweet from a Twitter® account is an instance of posting. Reposting is another social media activity that takes another social media contributor's user-generated content and displays that content on a social media network via an entity account. For example, if social media contributor X posts a tweet under his account (i.e., an entity account) on Twitter®, then social media contributor Y and/or user may receive that tweet if she is a follower of social media contributor X and may choose to retweet (i.e., repost) what social media contributor X tweeted. Users and social media contributors do not need to be part of the same entity. In fact, some embodiments assume that social media contributors and users that are communicating are not representing the same firm/entity. Commenting is another social media activity where a social media contributor and/or a user comments on a posting in Facebook® or a "like" of a Facebook® post. In some embodiments, social media activities may be a combination of posting, reposting and/or commenting. For example, a comment may also include a retweet.

A non-social media online profile does not include user-generated content and/or social media activities. For example, a non-social media online profile may be a merchant profile on Yahoo.com or Google.com search results page. These non-social media online profiles include information regarding the address of the entity, the phone number of the entity, links to reviews of the entity, physical location of the entity (if a firm, for example), practice area(s) and the like. Online profile information does not include "likes" on Facebook®, tweets on Twitter®, posts, reposts, and comments. Any information about an entity is either social media information or online profile information. If the information does not fit within the bounds of the social media information definition then the given information should, for some embodiments, be considered online profile information.

Exemplary System

FIG. 1 shows an exemplary system 100, respectively, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to invoke a unique resource locator (URL) on access device 130. Server 120 includes a processor module 121 and a memory 122, wherein the memory 122 further includes software modules 141, 142 and 143, a search module 123 and a content database 124. As shown in FIG. 1, in one embodiment, the software modules include a receiving module 141, a calculating module 142, and a delivery module 143. Details of the software modules 141, 142, and 143 configured in memory 122 are discussed in further detail below. Processor module 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) within access device 130 and server 120, respectively. Processor module 121 may use computer bus 102 to queue a request that is to be transmitted through a signal, from server 120, via a wireless or wireline transmission channel 150 and is then ultimately received by the processor module 131 through the utilization of computer bus 101. Generally, server 120 transmits the signal via a wireless or wireline transmission channel 150 to at least one access device, such as access device 130.

Processor module 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores software modules 141, 142 and 143, a search module 123 and a content database (DB) 124.

Search module 123 includes one or more search engines and related user-interface components (not shown), for receiving and processing queries against content database 124. Content database 124 takes the exemplary form of one or more electronic, magnetic, and/or optical data-storage devices. Content database 124 includes content relating to social media network information, online profile information, comments, posts, reposts, calculations related to the social media network information and/or online profile information and the like. The content and/or a subset of the content within the content database 124 may be subscriber content. Subscriber content includes content and related data for controlling, administering, and managing pay-as-you-go and/or subscription based access. For instance, a user may have to subscribe to an information retrieval service (e.g., Westlaw®). The content is stored in the content database 124 and cannot be accessed until a set of user credentials are authenticated. For instance, user credentials may be a user name and associated password. Once the credentials are successfully authenticated on server 120, a delivery signal, associated with at least one updated authority record, is transmitted via the wireless or wireline transmission channel 150 to access device 130. For purposes described herein, successfully authenticating a set of user credentials means the user credentials were accepted by an authentication system (not shown but well known to those skilled in the art).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines one or more of the software modules 141, 142 and 143 needs to be utilized, engages the given software module through the signal via a wireless or wireline transmission channel 150, accepts the software module output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When one or more of the software modules 141, 142 and 143 are initiated, a display 1381 is defined in memory 132 and rendered on graphical interface 138. Upon rendering, the graphical interface 138 presents the data/results in association with the set of instructions from the delivery module 143 as further discussed herein.

In addition, FIG. 1 also illustrates a social media network 190 which allows the creation and exchange of user-generated content via one or more social media network interfaces. Within the social media network 190 are a set of social media contributors 197, 198 and 199. The social media network 190 and the set of social media contributors 197, 198 and 199 are not considered part of system 100, method 200 (refer to FIG. 2 and the corresponding written description), and interfaces 300-600 (refer to FIGS. 3-6 and the corresponding written descriptions). However, social media network 190 may interact with the systems, methods and interfaces described herein. For example, system 100 may be configured to gather social media information from a social media network account in order to aggregate and ultimately present that information to a user.

Exemplary Method

Figure 2:
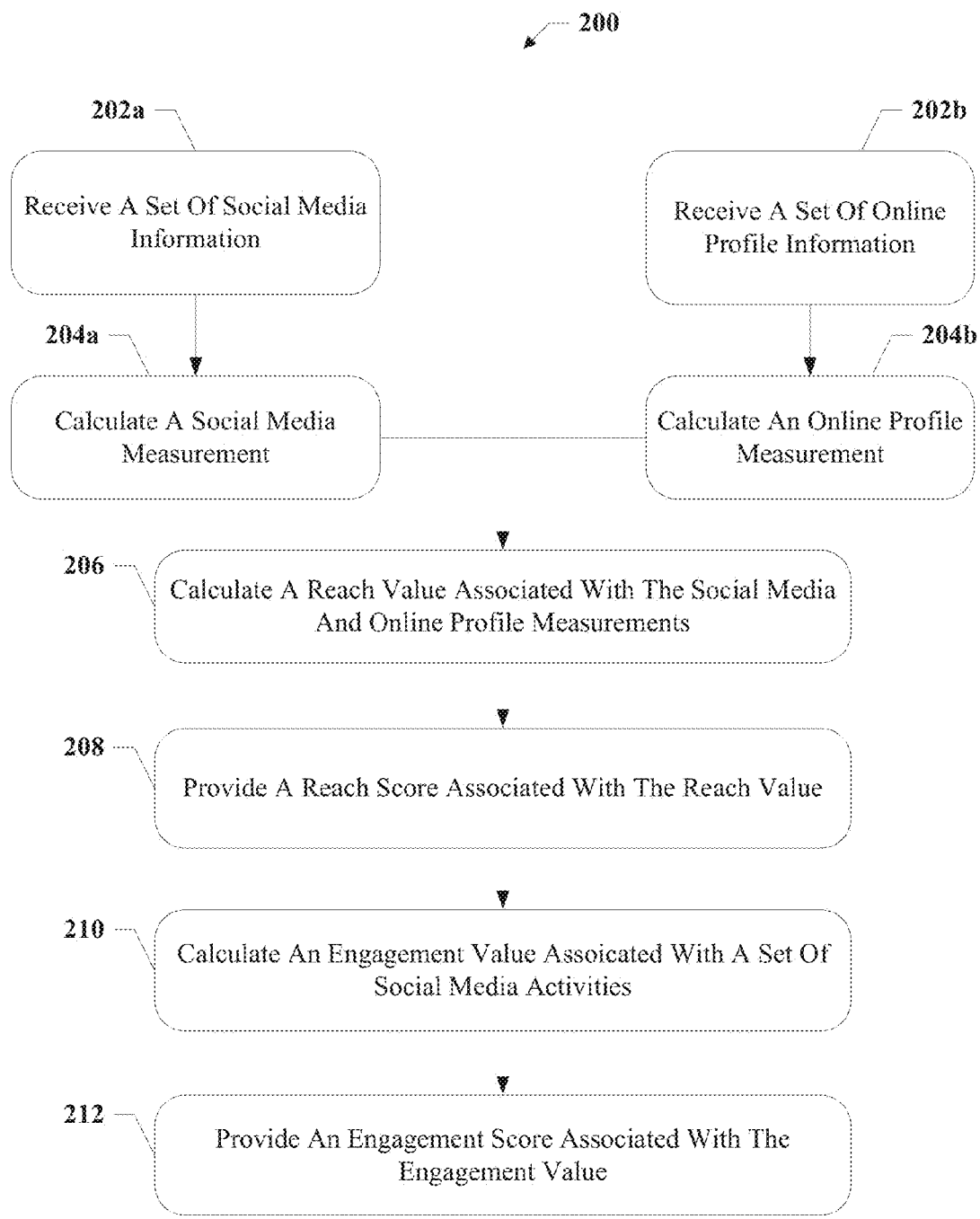
FIG. 2 is an exemplary method 200 which corresponds to one or more embodiments of the invention.

FIG. 2 shows an exemplary method 200. Method 200 includes functional blocks 202a-212. These functional blocks are steps that perform actions including assignments, decisions, assessments and other like functions. Some exemplary functions may include executing an equation. An exemplary equation may be a sum of two or more values such as VALUE=sum($X_1, X_2, \ldots X_n$) wherein the equation adds the values $X_1+X_2+\ldots X_n$. Another exemplary equation may be an average of two or more values such as VALUE=average($X_1, X_2, \ldots X_n$) wherein the equation adds the values $X_1+X_2+\ldots X_n$ then divides the total over n. Another exemplary equation may be a minimum of two or more values such as VALUE=min($X_1, X_2$) wherein the equation selects the minimum value between $X_1$ and $X_2$. Yet another exemplary equation may be an if/then value statement such as VALUE=if($X_1>X_2$, −0.3, 1) wherein the equation states that if $X_1$ is greater in value to $X_2$ then the VALUE equals −0.3 otherwise then the VALUE is 1.

In step 202a, the receiving module 141 receives a set of social media information. The set of social media network information may be a metric associated with a social media network 190. Exemplary social media network information may include the number of Facebook® likes, the number of Twitter® followers, the number of connections, the number of tweets, the number comments, the number of posts, the number of reposts and the like. After the set of social media information is received by the receiving module 141, the set may be stored in content database 124. Once the set of social media information is received, the process moves to step 204a.

In step 204a, the calculating module 142 calculates a social media measurement. The social media measurement is associated with the set of social media information. In one embodiment, the social media measurement is calculated by comparing a firm's profile against a goal profile to create a network percentage. For example, firm X's profile numbers may be considered an exemplary set of social media information.

TABLE 1

|  | GOAL PROFILES | FIRM X PROFILES |
| --- | --- | --- |
| TWITTER ® | 150 | 25 |
| FACEBOOK ® | 50 | 1 |
| LINKEDIN ® | 50 | 25 |
| GOOGLE+ | 50 | 25 |
| SUM OF PROFILES | 300 | 76 |
| NETWORK % |  | 25.33% |

For instance, in Table 1, there is a goal profile and a firm X profile. The goal profile has an optimal, pre-determined number for each social media network, in this case Twitter®, Facebook®, LinkedIn® and Google+®. For example, the goal profile has 150 Twitter® followers, fifty (50) Facebook® likes, fifty (50) LinkedIn® connections and fifty (50) Google+® connections. The firm X profile includes how many actual followers, likes and connections there are for firm X. In some embodiments, firm X's profile information is pulled from an application programming interface (API) or the like. An API allows system 100 conducting method 200 to pull information from a social media network 190 and/or push information to the given social media network 190. An exemplary pull scenario occurs when system 100 pulls information (e.g., number of Twitter® followers) from social media network 190 via an API. An example of a push scenario has a user creating a post using system 100, via method 200, which in turn gets pushed to social media network 190 via an API. The API transmits requests associated with information via the wireline or wireless transmission channel 150. Referring back to step 204a, the next calculation needed for calculating the social media measurement is a network value. An exemplary network value calculation determines how close firm X's profile numbers are to the goal profile numbers. The higher the value, the closer firm X's network is to the goal network. For example, the network value calculation takes the minimum value of either the sum of goal profiles or the sum of firm X profiles over the sum goal profile network. This may be represented as an equation in the following format:

$$\text{NETWORK}=\min(\text{sum(GOAL PROFILES)},\text{sum(FIRM X PROFILES)})/\text{GOAL PROFILES}$$

Using the above equation and the numbers in Table 1, NETWORK=min(300, 76)/300=76/300 or 0.2533. A network percentage of 25.33% may be calculated by multiplying the network value of 0.2533 by 100. In some embodiments, the network percentage is the social media measurement. After the social media measurement has been calculated using the calculating module 142, the process continues to step 206.

Prior to commencing step 206, steps 202b and 204b are executed. In some embodiments, steps 202b and 204b may be done before, after or simultaneously to steps 202a and 204a. Either way, in step 202b, the receiving module 141 receives a set of online profile information. For example, an exemplary set of online profile information may be the information shown in Table 2 below. Table 2 includes the source of the online profile (column one), a metric for monthly unique visitor traffic to each source (column two), a percentile rank (column three), a source weight (column four), a profile completeness score (column five) and a weighted profile completeness score (column six). Once the set of online profile information is received via the receiving module 141, the process executes step 204b.

In step 204b, the calculating module 142 calculates an online profile measurement. The online profile measurement is associated with the set of online profile information.

TABLE 2

| Online Profile Source | Monthly Unique Visitor Traffic | Percentile Rank | Source Weight* | Profile Completeness Score | Weighted Profile Completeness Score |
| --- | --- | --- | --- | --- | --- |
| AVVO | 997,672 | 0.28 | 28% | 50 | 14.00% |
| Bing Local | 99,014,394 | 0.96 | 96% | 88 | 84.48% |
| Citysearch | 10,759,719 | 0.6 | 60% | 52 | 31.20% |
| DexKnows | 4,139,965 | 0.44 | 44% | 71 | 31.24% |
| Google Maps | 47,966,110 | 0.88 | 88% | 82 | 72.16% |
| InsiderPages | 1,737,009 | 0.32 | 32% | 82 | 26.24% |
| Judy's Book | 145,913 | 0.08 | 8% | 0 | 0.00% |
| Kudzu | 608,848 | 0.2 | 20% | 0 | 0.00% |
| Local.com | 17,294,888 | 0.72 | 72% | 0 | 0.00% |

TABLE 2-continued

| Online Profile Source | Monthly Unique Visitor Traffic | Percentile Rank | Source Weight* | Profile Completeness Score | Weighted Profile Completeness Score |
|---|---|---|---|---|---|
| MerchantCircle | 5,867,065 | 0.52 | 52% | 0 | 0.00% |
| MojoPages.com | 311,577 | 0.12 | 12% | 0 | 0.00% |
| OpenList | 5,477 | 0.04 | 4% | 56 | 2.24% |
| SuperPages | 11,444,343 | 0.64 | 64% | 97 | 62.08% |
| WhitePages | 15,397,937 | 0.68 | 68% | 78 | 53.04% |
| Yahoo | 153,143,134 | 1 | 100% | 82 | 82.00% |
| Local | 17,294,888 | 0.72 | 72% | 26 | 18.72% |
| YellowBook | 5,497,002 | 0.48 | 48% | 79 | 37.92% |
| YellowBot | 746,773 | 0.24 | 24% | 86 | 20.64% |
| YellowPages.com | 30,679,926 | 0.84 | 84% | 73 | 61.32% |
| Yelp | 17,358,815 | 0.8 | 80% | 53 | 42.40% |
| Blogspot | 70,082,857 | 0.92 | 92% | 16 | 14.72% |
| Intuit | 315,746 | 0.16 | 16% | 83 | 13.28% |
| Patch | 6,350,033 | 0.56 | 56% | 67 | 37.52% |
| SUMS | | | 1056.00% | | 705.20% |

As mentioned previously, Table 2 includes various examples of online profile information. In some embodiments, this information may then be used to determine which sources should be weighted in terms of importance to an entity's online presence. For example, Yahoo® has over 150 million unique visitors to its website each month. OpenList®, however, has a little over 5,000 unique monthly visitors. In some embodiments, OpenList® is weighted differently than Yahoo® based on a higher amount of visitor traffic. This allows a function of percentile rank to occur for the listing of all online sources. A percentile rank of a score is the percentage of scores in its frequency distribution that are the same or lower than it. For example, column three (3) in Table 2 shows the percentile rank for each of the online sources. In some embodiments, the percentile rank is converted into a percentage. For example, in column four (4) in Table 2, the source weight percentage is calculated by multiplying the percentile rank for an online profile source by 100. A profile completeness score in column five (5) is given for each of firm X's profiles related to a source. For example, a completeness score for firm X's profile on Yahoo.com is 82. The closer the score is to 100, the more complete the online profile. Column six (6) is a weighted completeness score. The weighted completeness score multiplies columns four (4) and five (5) to enhance which profiles are the most complete and the most popular. For instance, referring again to the Yahoo® online profile, the completeness score is 82 and the source weight is 100%. This allows for a weighted completeness score for the Yahoo® online profile to be 82%. However, a less visited website labeled YellowBot® has a higher completeness score to Yahoo at 86. Yet, the source weight given to this website is only 24%. Thus, the weighted completeness score for YellowBot® is only going to be approximately 20%.

Once the weighted completeness scores are calculated for each source that has a firm X online profile, an overall completeness score is calculated using the calculating module 142, The overall completeness score is the sum of the weighted completeness scores divided by the sum of the source weights. Therefore, the overall completeness score for firm X is 705.20%/1056%=66.78%. Next, the calculating module 142 determines the percentage of non-social media, non-zero completeness score online profiles (herein referred to as the "non-social media percentage"). A non-social media, non-zero completeness score online profile is an online profile that has some information populated. This percentage calculation is the percentage of online profiles that were actually filled out over a total number of online profiles. For example, referring back to Table 2, eighteen (18) online profiles had a non-zero completeness score. In addition, five (5) of the online profiles had a zero completeness score. Therefore, when determining the percentage of non-zero completeness score online profiles, the equation is:

NSM=#of Online Profile Sources With A Non-Zero Completeness Score/Total #Of Online Profile Sources, where #NSM is the non-social media percentage.

Applying the equation to the current example, #NSM=18/23=78.26%.

Next, an overall non-social media score is calculated using the calculating module 142. The overall non-social media score is an average of the overall completeness score and the non-social media percentage. In equation form:

NSM SCORE=average(COMPLETENESS, #NSM), where average(COMPLETENESS, #NSM) represents the average of COMPLETENESS and #NSM.

TABLE 4

| COMPLETENESS | 66.78% |
|---|---|
| # NSM | 78.26% |
| NSM SCORE | 72.52% |

TABLE 5

| NSM SCORE | 72.97% |
|---|---|
| SM SCORE | 75.00% |
| PROFILE | 73.99% |

Applying the numbers from Table 4, the NSM SCORE=average(66.78%, 78.26%)=72.52%. In some embodiments, the overall non-social media score is also known as the online profile measurement. Yet in other embodiments the online profile measurement may be an average of the overall non-social media score and a social media score. This social media score may be a pre-determined percentage based on the firm's subscription package. For example, in some commercial exemplary embodiments, a customer would get a pre-determined percentage based on the subscription package and services included (e.g., network building & content creation). For instance, based on a starter subscription package, a service may set up a firm so that the initial reach score is 15%, but the firm's engagement score would be zero until the firm reflects its own social media activity. In another instance, based on an essential subscription package, another firm might get set up with a reach score of 30% and an engagement score of 30% based on an estimated percentage of Twitter® social media contributors following the firm (triggered by network building activity). The firm is expected to supplement that social media activity to further increase its engagement score. Referring back to an online profile measurement being an average of the overall non-social media score and a social media score, in equation form:

PROFILE=average(NSM Score, SM Score)

Applying the numbers from Table 5, PROFILE=average (72.97%, 75%)=73.99%. Therefore, in the current example, an online profile measurement is determined to be 73.99%. Once the online profile measurement is calculated, the process advances to step 206.

In step 206, the calculating module 142 calculates a reach value. The reach value is associated with the social media measurement and the online profile measurement. In some embodiments, the reach value equals the average of the social media measurement and the online profile measurement. In equation format:

REACH VALUE=average(PROFILE, NETWORK)

Using the previous PROFILE and NETWORK calculations described in steps 204a and 204b, respectively, REACH VALUE=average(73.99%, 25.33%)=49.66%. Once the reach value is calculated via the calculating module 142, the process moves to step 208.

In step 208, the delivery module 143 provides a reach score. The reach score is based on the reach value. In some instances, the reach score may be the reach value. Furthermore, in some embodiments, this reach score may be ultimately displayed to the user in exemplary interfaces such as interfaces 300-500. In particular, an exemplary reach score 305 is displayed in FIG. 3.

In other embodiments, method 200 moves to step 210. In step 210, the calculating module 142 calculates an engagement value. In one exemplary embodiment, the engagement value may be the average of social media balance value and twice the frequency value. In this exemplary embodiment, the frequency value is weighted more heavily to emphasize the importance of frequency over balance. However, one skilled in the art appreciates that the importance of the balance and frequency values may be weighted differently in different embodiments. Social media balance is needed because social media is not just about posting thoughts or reposting what others say. A balance must be struck between all the social media activities. The frequency value takes into account how often a firm utilizes social media activities and compares the value to a goal frequency value described later herein. Referring back to the engagement value, the engagement value may be represented as an equation in the following format:

ENGAGEMENT=average(BALANCE,FRE-
QUENCY,FREQUENCY) where the FRE-
QUENCY value is added twice before being
averaged. In order to calculate the balance and
frequency, social media activities are monitored
and used.

TABLE 6

|  | GOAL PROFILE | FIRM X PROFILE |
| --- | --- | --- |
| POSTS | 9 | 7 |
| REPOSTS | 9 | 6 |
| COMMENTS | 2 | 2 |
| POSTS % | 45.00% | 46.67% |
| REPOSTS % | 45.00% | 40.00% |
| COMMENTS % | 10.00% | 13.33% |
| BALANCE % |  | 92.86% |
| FREQUENCY % |  | 75.00% |
| ENGAGEMENT % |  | 80.95% |

For example, in Table 6, two profiles are compared: a goal profile and a firm X profile. The goal profile, as explained earlier, is a profile where a pre-determined number of social media activity is to be performed per week. The firm X profile is the actual number of social media activities the firm performed per week. In this instance, posts are the number of posts per week on Facebook® and Twitter®. Reposts are the number of reposts per week on Facebook® and Twitter®. Comments are the number of comments per week on Facebook® and Twitter®. Next, firm X's profile is assessed to determine the balance of social media activities. The balance calculation is represented by the following equation:

BALANCE=1−(if(REPOSTS>POSTS, −0.3,1)*
(POSTS−REPOSTS)/(POSTS+REPOSTS+1))

Using the above equation and Table 6 information for firm X, BALANCE=1−(if(6>7 then −0.3 otherwise 1)*(7−6)/(7+6+1))=1−((1*1)/14)=1−(1/14)=0.9286 or a balance percentage of 92.86%. The higher the percentage, the more balanced a firm is with its social media activities.

Next, a comparison is done between a frequency of social media activities and a goal profile. The frequency comparison calculation is represented by the following equation:

FREQUENCY=(min(POSTS,POSTS_GOAL)+min
(REPOSTS,REPOSTS_GOAL)+min(COM-
MENTS,COMMENTS_GOAL))/sum(POSTS_
GOAL,REPOSTS_GOAL,COMMENT
S_GOAL)

Using the above equation and Table 6 information for firm X, FREQUENCY=(min(7, 9)+min(6, 9)+min(2, 2))/sum(9, 9, 2)=(7+6+2)/20=15/20=0.75 or a frequency percentage of 75%. The higher the percentage the more frequency a firm has with its social media activities. Once the engagement value is calculated, the process executes step 212.

In step 212, the delivery module 143 provides an engagement score. The engagement score is based on the engagement value. In some instances, the engagement score may be the engagement value. Furthermore, in some embodiments, this engagement score may be ultimately displayed to the user in exemplary interfaces such as interfaces 300-500. In particular, an exemplary engagement score 306 is displayed in FIG. 3.

In some embodiments of method 200, steps 210 and 212 are not implemented after steps 202a-208. Instead, steps 210 and 212 may be implemented before or simultaneously with steps 202a-208.

Exemplary Interfaces

Figure 3:
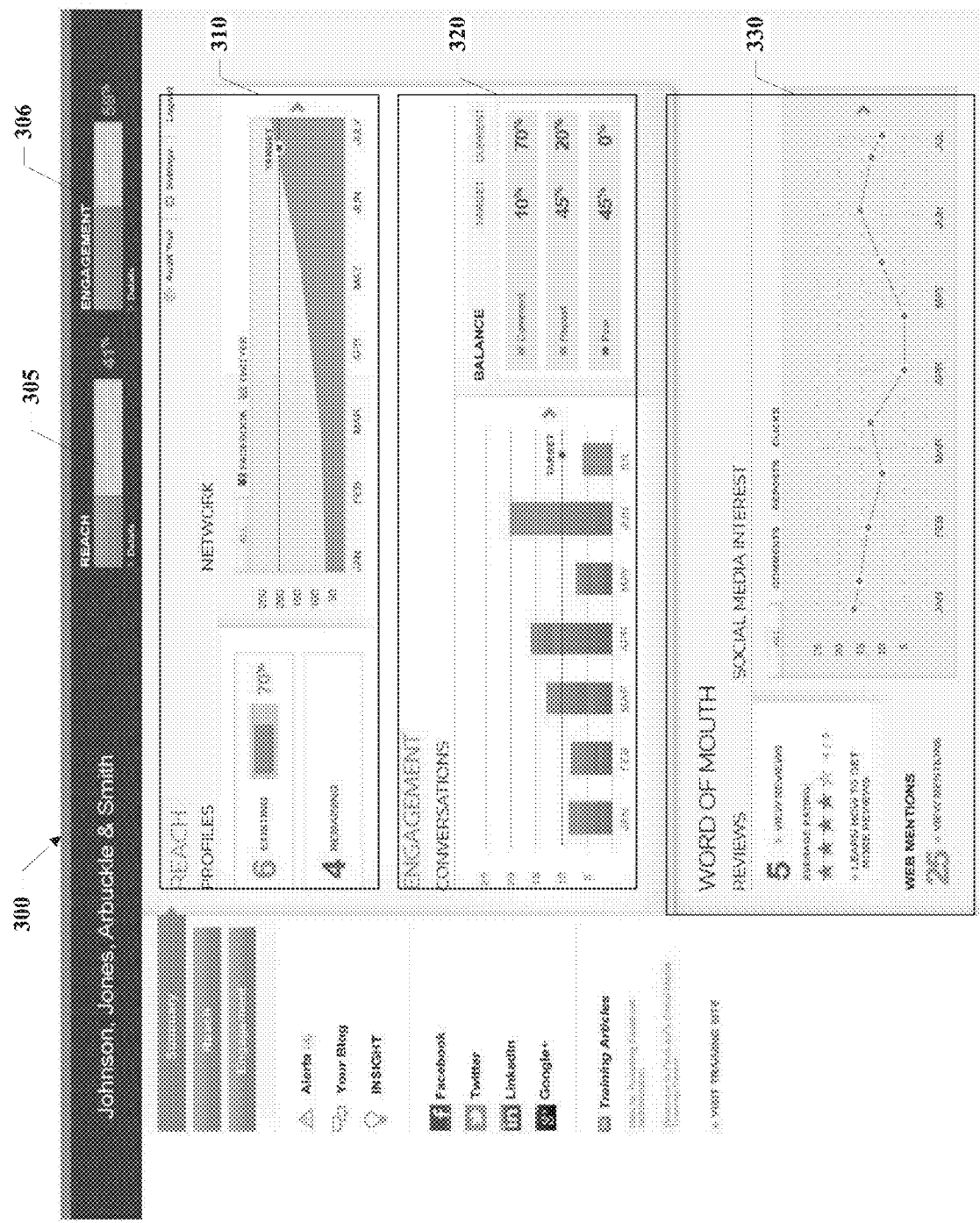
FIG. 3 is an exemplary interface 300 which corresponds to one or more embodiments of the invention.

FIG. 3 shows an exemplary interface 300 that depicts a summary page. This summary page illustrates the effectiveness in reach and engagement activities. Exemplary interface 300 helps a firm (i.e., an entity) gain insight into its social activities and identifies areas for improvement. There are three sections within the summary page: a reach section 310, an engagement section 320, and a word of mouth section 330. Each section is discussed herein. The reach section 310 highlights profile and network information. Exemplary profile information may depict the number of existing profiles, as well as a completeness percentage of the existing profiles. Another example of profile information may include a number of remaining profiles. The number of remaining profiles refers to how many recommended business profiles a firm has yet to create. Exemplary network information may be a graphical representation of the firm's social media footprint. The "All" tab navigates a user to a combination of all the firm's social network accounts. The different shadings differentiate between the number of people a firm follows and the number of people the firm is following. Another example of network information (not shown) may be a graphical view of the number of fans who like the firm's Facebook® page over time. Yet another example of network information (not shown) may be a graphical view of the number of people the firm follows and the number who follow the entity over time. In some embodiments, some if not all graphs are updated multiple times daily.

The engagement section 320 highlights conversations and balance information. Exemplary conversations information may be a summary of the firm's social media activities. For example, social media activities may include commenting, reposting and/or posting. An exemplary commenting activity may include a "like" and/or a comment in Facebook® and/or a mention and/or a reply in Twitter®. An exemplary posting activity may include a status update in Facebook® and/or a tweet in Twitter®. An exemplary reposting activity may include a share on Facebook® and/or a re-tweet in Twitter®. Turning to the balance information, balance is a factor in effective social media engagement. A balanced social media engagement not only includes initiating conversations, but also listening to others and providing feedback. For instance, too much of one activity, such as posting, may seem burdensome to a firm's followers. Yet, too little activity may decrease a firm's social media footprint. Therefore, an exemplary balance value may include a mix of all the social media activities. For example, a balance value may include a target balance percentage along with the actual balance percentage for comments, reposts and posts.

The word of mouth section 330 highlights reviews, mentions and social media interest. Online reviews and web mentions are great indicators of word of mouth. For example, they include reviews posted on Google® about a firm's service and mentions of the firm on personal blogs They may also signify the quality of firm's brand based on clients' opinions. In some embodiments, the reviews may be a digital representation of a client's level of satisfaction. Online reviews are a new reality that law firms have to be aware and actively manage. Monitoring for the online feedback a firm receives regarding its services is one step. Working to acquire additional positive reviews online is another step toward a healthy presence online. The reviews section displays the number of online reviews found for a firm. The star rating shows the average rating for the given film based on the number of reviews found. To see more information about the review, a "View Reviews" link may be made available (not shown) and the user can be directed to a detailed reviews webpage (not shown). There the user is able to see details on each review, such as the source, rating, date and content of the review. The web mentions section scans the web for a given farm name, essentially listening for any time the firm is mentioned. Web mentions are any posting of information about the firm online. They can occur on websites, blogs, news outlets, in press releases and articles, and on social media channels. To see more information about the mentions, a "View Mentions" link may be made available (not shown) and the user can be directed to a detailed mentions webpage (not shown). There the user is able to see more information on each mention. Information includes the title, date and link here the mention can be found. An exemplary social media interest graph represents a firm's social media involvement over time. For example, a social media interest graph shows how others has engaged with a firm's content. The graph reflects if others have commented or liked the given entity's Facebook® posts, retweeted the entity's Twitter® posts or clicked on links that the entity posted. If a social media connection has reposted the entity's Twitter® or Facebook® post, the graph reflects this as a repost. If as connection has liked or commented on a Facebook® post the entity has hats initiated, the graph indicates that activity. It also provides data on how many social media contributors clicked on links the entity has posted to its social networks. Essentially, the social media interest metric provides insight on which pieces of content generate the most engagement from others.

Figure 4:
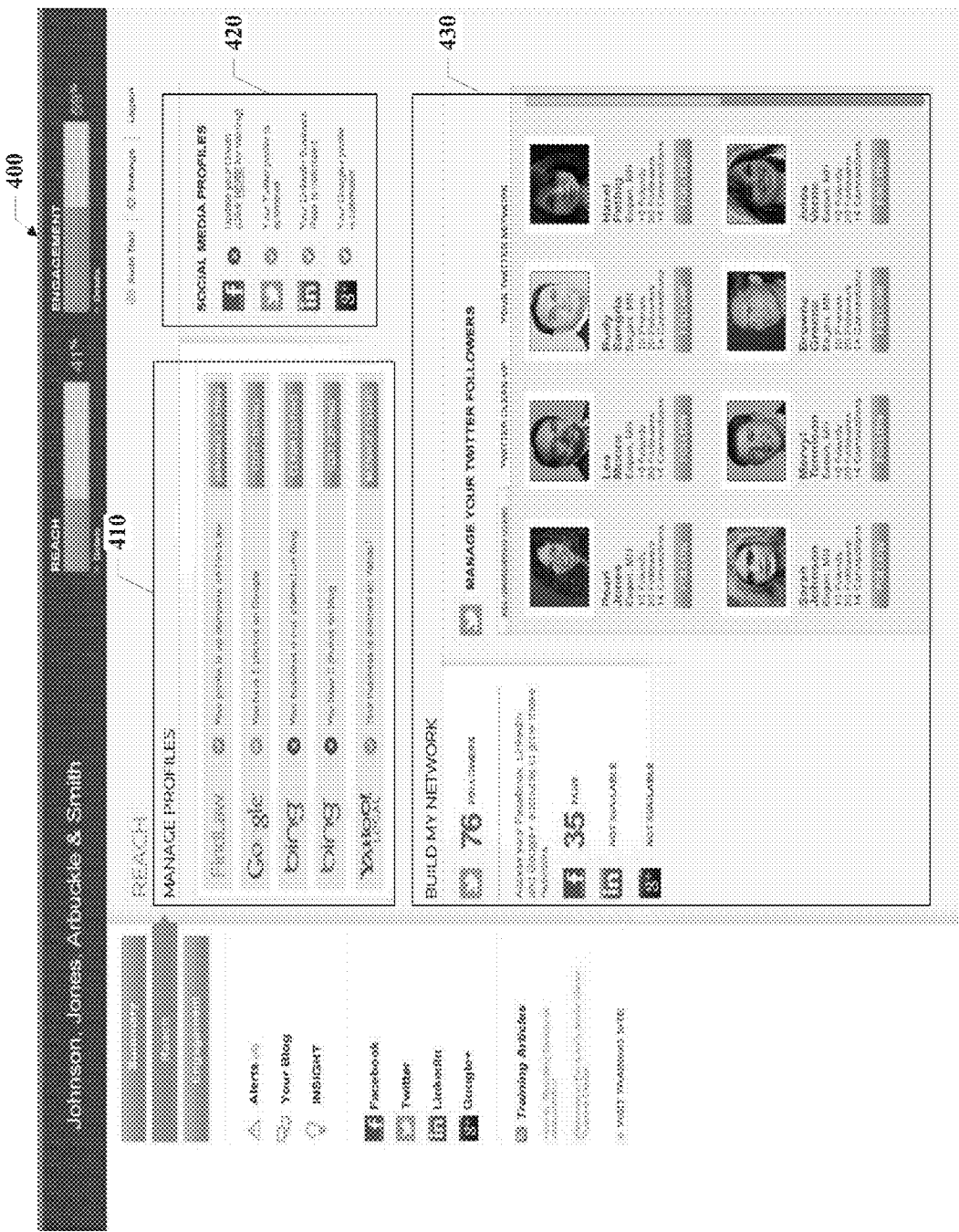
FIG. 4 is an exemplary interface 400 which corresponds to one or more embodiments of the invention.

FIG. 4 is an exemplary interface 400 which details efforts around the reach of a firm. Reach refers to a firm's digital connections made on social media networks like Facebook®, Twitter®, LinkedIn® and Google+®. The benefit of creating online relationships is the extension of a firm's reach. A firm's reach online includes who follows the firm. As the firm's number of connections to others increases, so does the firm's potential to influence them with the firm's legal industry expertise. Exemplary interface 400 has three sections: a manage profiles section 410, a social media profiles section 420 and a build my network section 430. The manage profiles section 410 reports details on online profiles that have been found for a given firm. This section alerts the firm to inaccurate or missing information, such as a missing phone number or photo. The firm is provided a link to make corrections or additions to the given online profile. If the firm does not have a listing in any of the key online directories (e.g., Yahoo.com), a link is given to visit each site so the user representing the firm can create an online profile. In recent years search queries have become much more locally focused, particularly when the search query is sent from a mobile access device. Therefore, in some embodiments, local business online directories are scanned to determine if the firm is currently listed.

The social media profiles section 420 allows the user to view the status of the firm's social media profiles. A green icon with a check indicates the firm's profile is in good standing and has all the verification it needs to be online and visible. A red icon with an "X" indicates there is an opportunity to optimize the firm's profile. In addition, a link may be provided to the user to repair any issues and/or additional information on how to implement the optimization. In order for the social media network 190 to communicate with system 100, a verification protocol is needed. Exemplary verification protocols are known to those skilled in the art. If the verification protocol is not rendered correctly, then the user is not able to make posts from system 100 to a firm's social media profile on social media network 190.

The build my network section 430 displays statistics about the firm's social media sites such as the number of Twitter® followers and Facebook® likes. In addition, section 430 facilitates network growth through recommending Twitter® social media contributors with relevance to the legal industry. The recommendations a user sees include other lawyers, bar associations and local businesses. Forming digital relationships with others encourages conversation and deepens a firm's exposure online The "Recommended Users" tab highlights Twitter® social media contributors relevant to the legal industry and a firm's geographic location. To use this feature, a user clicks the "Recommended Users" tab. The user is then navigated to a listing of recommended Twitter® social media contributors. The user sees the recommended social media contributor's name, location, number of friends, followers and connections below. If a user chooses to follow the recommended social media contributor, he/she clicks on the "Follow" button. To view even more information about the recommended social media contributor, the user clicks on the entity's name and is directed to the entity's Twitter® page. As stated previously, the recommended social media contributors are chosen based on geographical location. It is important to connect with other experts in a firm's practice area to build potentially useful referral relationships. It is also powerful to connect with Twitter® social media contributors within the community as local business owners have high potential to connect the firm with new opportunities in the area. However, in some embodiments, the list of recommended social media contributors is filtered to remove potential competitors from displayed.

Figure 4A:
FIG. 4A is an exemplary interface 400A which corresponds to one or more embodiments of the invention.

A social media best practice is to maintain a balance between those the firm follows and those who follow the firm. FIG. 4A illustrates an exemplary interface 400A that helps to maintain a balance through the Twitter® clean-up feature. The firm is provided with a recommended list of social media contributors to not follow (hereinafter "unfollow"). In some embodiments, social media contributors are flagged for clean-up if they have not followed the firm back in ninety (90) days. To use this feature, a user clicks on the "Twitter® Clean-Up" tab and interface 400A appears. A number of profiles who are candidates for clean-up are shown. If the user chooses to unfollow or "clean-up" a social media contributor, he/she simply selects the "Unfollow" button.

The "Your Twitter® network" tab is a listing of each entity the firm follows on Twitter®. To view the Twitter® network, click the tab and a full list displays (not shown). A user is also able to select which followers the firm does not want to be unfollowed. This ensures key Twitter® profiles stay in the firm's network.

Figure 5:
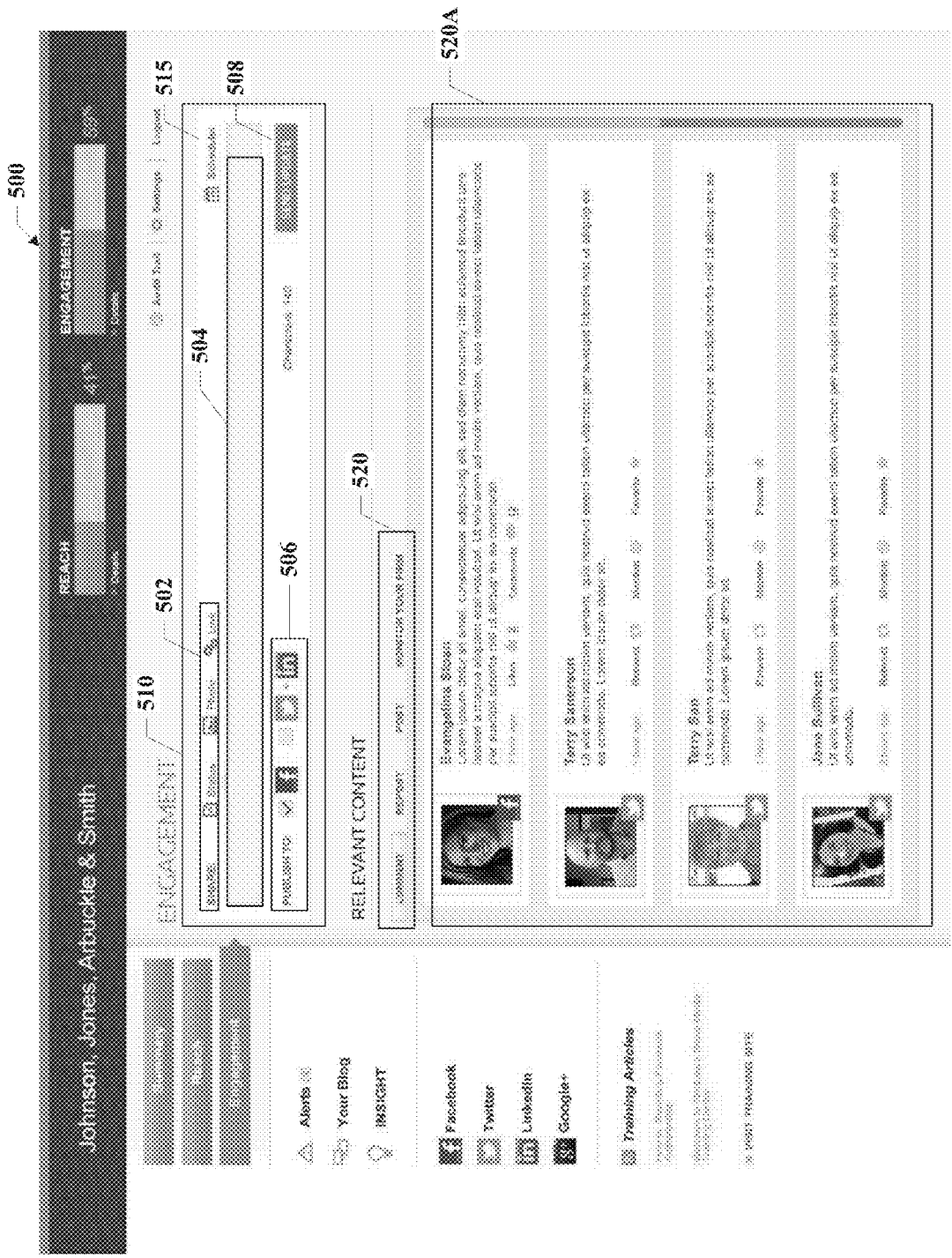
FIG. 5 includes exemplary interface 500 and section 520A which correspond to one or more embodiments of the invention.

FIG. 5 is an exemplary interface 500 which allows a user to engage by creating content and conversation. Engagement activities are social media activities which include posting, reposting and/or commenting. An exemplary post may include any content the firm shares to its Facebook® or Twitter® stream. Posts can be shares of the content displayed in the firm's post stream. This content is customized news from the firm's specific practice area. A user representing the firm may also create a unique post with a link to information the user has found elsewhere on the web or a thought or idea of the firm's. Note that the content is customized to the firm's practice area but not all information will be relevant for the firm. Be selective about the information the firm chooses to share. It should reflect the firm's expertise. A repost is posting any content that is included in the firm's repost stream. This stream is made up of tweets from the list of recommended Twitter® social media contributors. Again, this is a compilation of legal professionals in the firm's practice area and members of the community. Use discretion when reposting content from this area to determine if it is conveying the right message for the firm.

A comment includes a comment to a post in Facebook® or a "like" of a Facebook® post. A comment also includes retweets. It is important to post, repost and comment regularly and steadily. Too many engaging activities in one day could fatigue the firm's network members. Too few engagement activities could diminish the firm's presence within its social sphere.

Figure 5A:
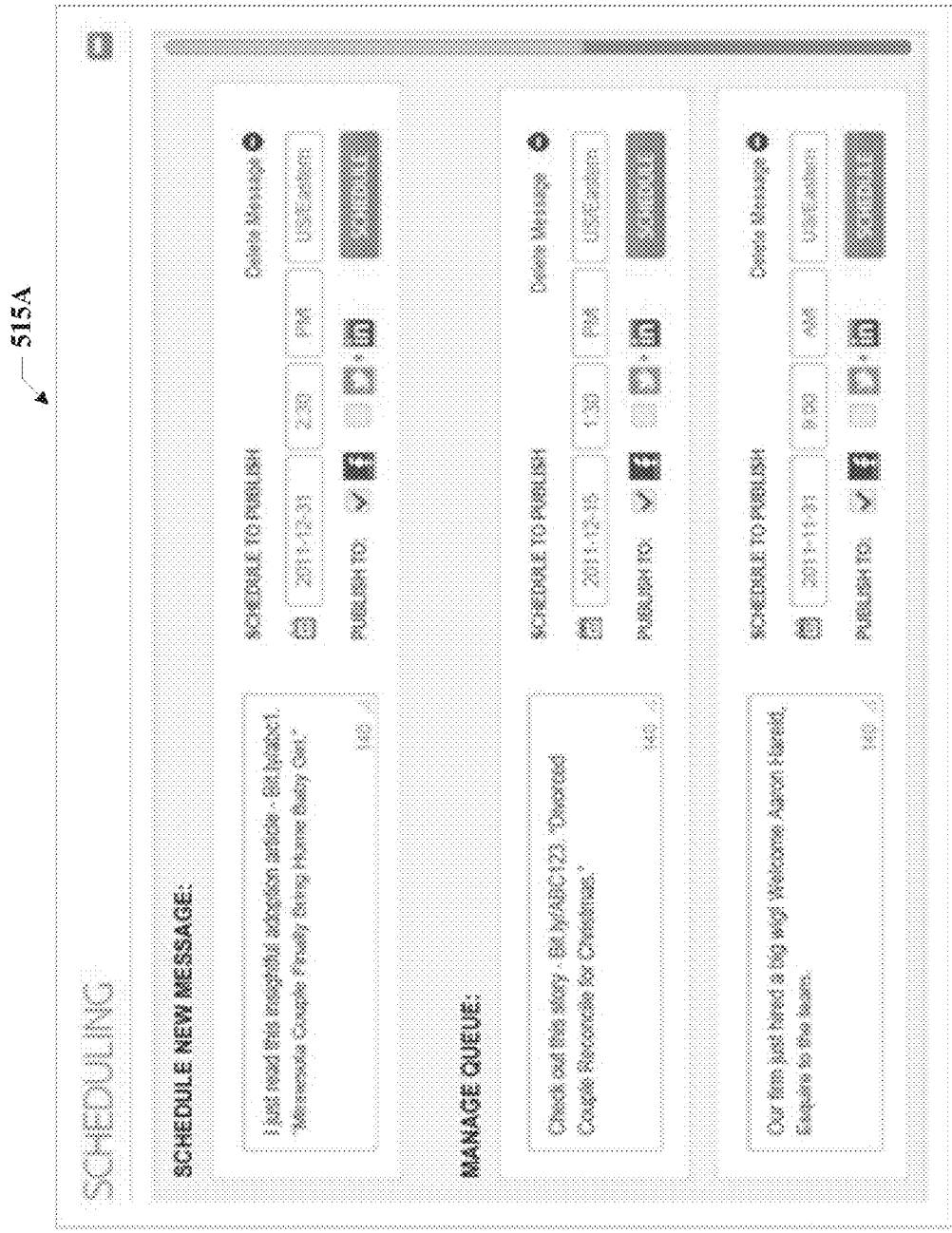
FIG. 5A is an exemplary interface 515A which corresponds to one or more embodiments of the invention.

A user may create content and conversations via the share section 510 of exemplary interface 500. Within the share section 510 is a share field 502 with a text box 504, a publishing field 506, a send update button 508 and a scheduler link 515. The share field 502 is where the user chooses to update a status, share a photo or post a link. If the user only intends to enter a text update, the user types the text into text box 504. In some embodiments, the text box 504 is limited to 140 characters, which is based on Twitter's character limitations. As the user composes a status update, the character number changes based on the user's input. To share a photo, the user clicks on the "Photo" link above the text box 504. To enter a link, the user clicks the "Link" link and enters a URL he/she wishes to share. Once the user has composed the post, he/she must select which social media network it should be published. The user may select Facebook®, Twitter® or both using the check boxes in the publishing field 506. After the user has completed the post, he/she clicks the "Send Update" button 508. In some embodiments, the user may choose to send the post later. For instance the user may want to send a regular weekly status update. In that situation, the user would select the scheduler link 515. FIG. 5A illustrates a scheduler interface 515A which appears in a new window after the scheduler link 515 has been selected. In the "Schedule New Message" text box, the user enters the post he wishes to share later. Under "Schedule To Publish," the user enters the date and time the post is to be released. Then, the user selects which social media networks the post is published. The user may choose Facebook®, Twitter® or both. Once all the information has been input, the user clicks the "Schedule" button. In the Manage Queue section, the user may view previously scheduled posts, alter the date and time for a post release, and edit which social media network the post will be published. The user may also delete the scheduled post.

Referring back to FIG. 5, another section within the exemplary interface 500 is the relevant content section 520. In some embodiments, the relevant content is gathered by Findlaw® to ensure relevance. For example, Findlaw® may have automated filters that identify relevant content within a pre-vetted list of users. In addition, the relevant content may come from various users in a related practice area or non-related practice area. For instance, if user X is a personal injury attorney, the relevant content is related to personal injury. The relevant stream of content may be content from another personal injury attorney and/or the content may also be from a family law attorney who has posted about personal injury. Each tab within the relevant content section 520 is described herein.

The "Comment" tab navigates the user to an exemplary interface 520A which provides a news feed of posts made by the firm's Facebook® and Twitter® connections. An icon indicates the social network from which the post originates. This section also allows the user representing the firm to comment or share another entity's content. For example, the user may "like" another entity's content. "Liking" a post signifies support for a post and is a way to foster a bond between the firm and the poster. In another example, a user may comment on another entity's post. A comment can be whatever the user chooses. A comment often includes agreement on a given post, but it can also be a question or addition to the topic. In addition, the original poster can then comment back, creating a conversation. These electronic conversations are very powerful, as they help to develop others' online awareness of the firm. In yet another example, a user may "retweet" another person's tweet in the firm's Twitter® feed. "Retweeting" is a way to deepen a relationship between the firm and the original tweeter. In yet another example, the user may utilize the @mention which allows the user to engage in communications via a Twitter® connection.

Figure 5B:
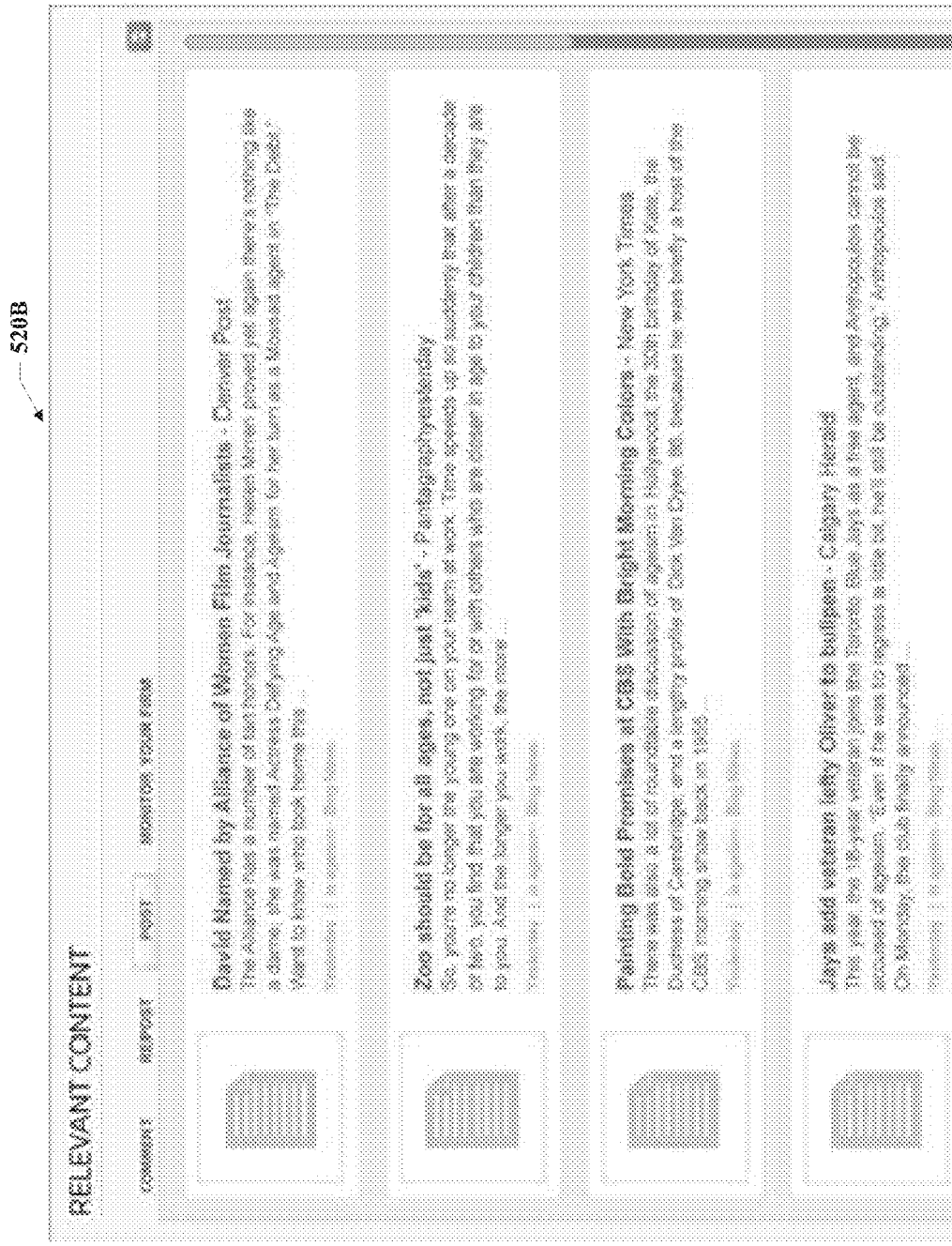
FIG. 5B is an exemplary interface 520B which corresponds to one or more embodiments of the invention.

The "Post" tab navigates the user to an exemplary interface 520B, in FIG. 5B, which provides a stream of content relevant to the legal industry. For example, the stream of content may be a Rich Site Summary (RSS) feed that has been filtered by practice area relevant queries to only provide content that is relevant to the firm's practice areas. It is important to establish the firm as a thought leader in the industry. Posting legal news and developments can help convey the level of expertise and connectedness to the industry. A user can post this information using system 100 which in turn pushes the information to the firm's Facebook® and/or Twitter® social media profiles.

Figure 5C:
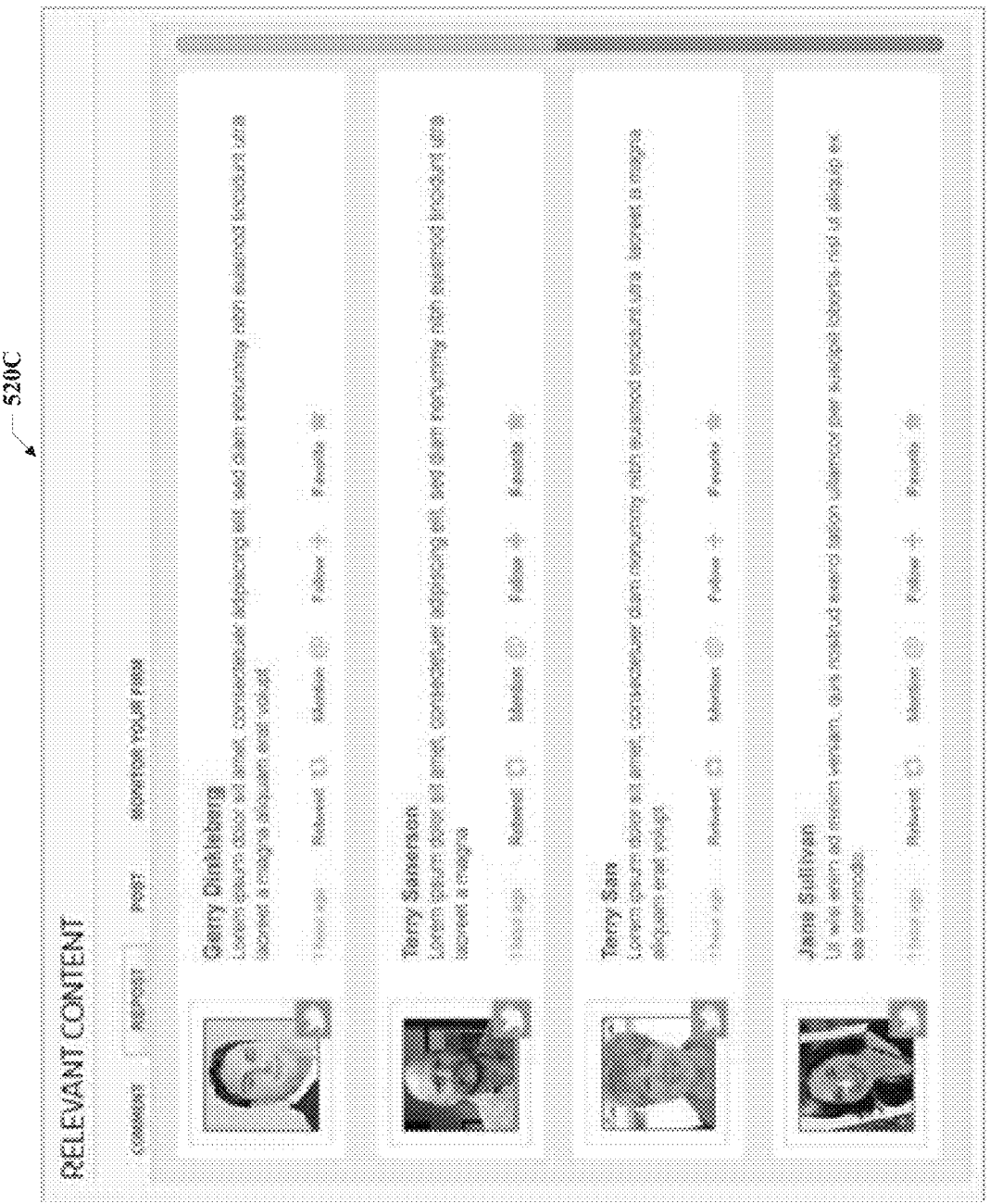
FIG. 5C is an exemplary interface 520C which corresponds to one or more embodiments of the invention.

The "Repost" tab navigates the user to an exemplary interface 520C, in FIG. 5C, which provides a stream of relevant tweets from a list of entities. Exemplary content may be content relevant to the firm's practice area. The user may also follow profiles from this section if the user wishes to add those profiles to the firm's network of Twitter® connections.

The "Monitor Your Firm" tab navigates the user to an interface (not shown) of web mentions of the firm and attorneys. Web mentions refer to retweets and @mentions of the firm on Twitter®. The user representing the firm can respond to web mentions directly from the above-mentioned interface.

Figure 6:
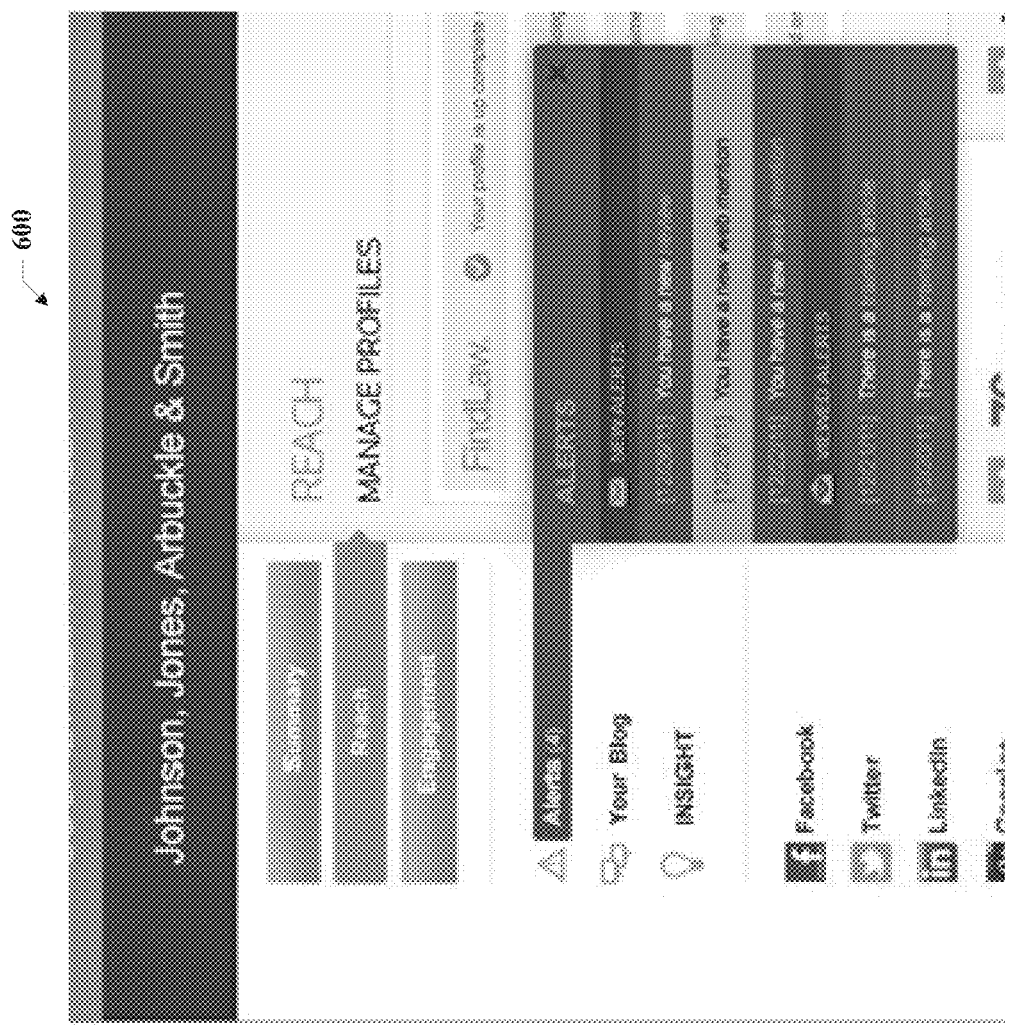
FIG. 6 is an exemplary interface 600 which corresponds to one or more embodiments of the invention.

FIG. 6 illustrates an exemplary interface 600 for alerts. An alert link is located in the left hand navigation of exemplary interface 600. When a user places a cursor over the alert link, a menu slides out. The menu presents a list of new alerts for the given firm. Alerts include new reviews, new web mentions, social profile authorization information and/or links to new training articles. The user can click on any alert to view more information. If an alert has previously been viewed, the given alert will be listed in the "Viewed Alerts" section of the slide out menu.

The embodiments described above and in the claims are intended only to illustrate and teach one or more ways of practicing or implementing the present invention, not to restrict its breadth or scope. For example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

The invention claimed is:

1. A computer-implemented method for evaluating an online entity presence, the method comprising:
   obtaining through an application programming interface a set of social media information for at least one law firm entity, said application programming interface comprising at least one point of interaction with a social media network and a non-social media network;
   calculating automatically, according to a set of computer readable program instructions executable by a processor, a social media measurement, the social media measurement associated with the set of social media information, the social media measurement comprising at least a network percentage, the network percentage associated with one or more goal profiles and one or more law firm profiles, a given goal profile comprising a social media network activity goal value for the social media network and a given law firm profile comprising the number of social media network activity for the social media network for the law firm entity;
   obtaining through the application programming interface a set of online profile information for the at least one law firm entity, the set of online profile information associated with one or more non-social media online profiles, the non-social media online profiles comprising in part of non-user generated content or social media activities;
   calculating, according to a set of computer readable program instructions executable by the processor, an online profile measurement, the online profile measurement associated with the set of online profile information, the online profile measurement comprising at least an overall non-social media score, the overall non-social media score comprising a non-social media percentage, the non-social media percentage comprising the number of on-line profile populated over a total number of on-line profiles;
   calculating, according to a set of computer readable program instructions executable by the processor, a reach value, the reach value associated with the social media measurement and the online profile measurement;
   presenting a reach score to a user, the reach score associated with the reach value;
   evaluating the reach score to determine whether a minimum number of social media profiles has been satisfied; and
   adding one or more additional social media profiles if the minimum number of social media profiles has not been satisfied.

2. The method of claim 1 wherein the set of social media information comprises a representation of network connections from one or more social media networks.

3. The method of claim 2 wherein the set of online profile information comprises:
   a profile completeness probability, the profile completeness probability comprising a sum of weighted profiles over a sum of weighted merchants.

4. The method of claim 3 further comprising:
   calculating an engagement value, the engagement value associated with a set of social media activities; and
   providing an engagement score to the user, the engagement score associated with the engagement value.

5. The method of claim 4 wherein the set of social media activities comprises one or more of a posting activity, a re-posting activity and a comment activity.

6. A system for evaluating an online entity presence comprising:
   a processor;
   a memory coupled to the processor; and
   a set of computer readable program instructions executable by at least one of the memory and the processor, the set of computer readable program instructions configured to:
     receive a set of social media information for at least one law firm entity;
     calculate a social media measurement, the social media measurement associated with the set of social media information, the social media measurement comprising at least a network percentage, the network percentage associated with one or more goal profiles and one or more law firm profiles, a given goal profile comprising a social media network activity goal value for the social media network and a given law firm profile comprising the number of social media network activity for the social media network for the law firm entity;

receive a set of online profile information for the at least one law firm entity, the set of online profile information associated with one or more non-social media online profiles, the non-social media online profiles comprising in part of non-user generated content or social media activities;

calculate an online profile measurement, the online profile measurement associated with the set of online profile information, the online profile measurement comprising at least an overall non-social media score, the overall non-social media score comprising a non-social media percentage, the non-social media percentage comprising the number of on-line profile populated over a total number of on-line profiles;

calculate a reach value, the reach value associated with the social media measurement and the online profile measurement;

provide a reach score to a user, the reach score associated with the reach value;

evaluate the reach score to determine whether a minimum number of social media profiles has been satisfied; and add one or more additional social media profiles if the minimum number of social media profiles has not been satisfied.

7. The system of claim 6 wherein the set of social media information comprises a representation of network connections from one or more social media networks.

8. The system of claim 7 wherein the set of online profile information comprises:
   a profile completeness probability, the profile completeness probability comprising a sum of weighted profiles over a sum of weighted merchants.

9. The system of claim 8 wherein the set of computer readable program instructions further configured to:
   calculate an engagement value, the engagement value associated with a set of social media events; and
   provide an engagement score to the user, the engagement score associated with the engagement value.

10. The system of claim 9 wherein the set of social media events comprises one or more of posts, re-posts and comments.

11. The method of claim 1 wherein the network percentage comprises the minimum value of either the sum of one or more goal profiles or sum of one or more law firm profiles, over the sum of the one or more goal profiles.

12. The method of claim 1 wherein the reach value comprises an average of the social media measurement and the online profile measurement.

13. The system of claim 6 wherein the network percentage comprises the minimum value of either the sum of one or more goal profiles or sum of one or more law firm profiles, over the sum of the one or more goal profiles.

14. The system of claim 6 wherein the reach value comprises an average of the social media measurement and the online profile measurement.

* * * * *